(12) United States Patent
Tseng

(10) Patent No.: US 8,681,178 B1
(45) Date of Patent: Mar. 25, 2014

(54) SHOWING UNCERTAINTY IN AN AUGMENTED REALITY APPLICATION

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 477 days.

(21) Appl. No.: 12/917,945

(22) Filed: Nov. 2, 2010

(51) Int. Cl.
*G09G 5/00* (2006.01)
*G06T 19/00* (2011.01)

(52) U.S. Cl.
CPC .................................. *G06T 19/006* (2013.01)
USPC .......................................... 345/633; 345/629

(58) Field of Classification Search
CPC ...................................................... G06T 19/006
USPC ................................................ 345/633, 629
See application file for complete search history.

(56) References Cited

U.S. PATENT DOCUMENTS

| | | | |
|---|---|---|---|
| 6,094,625 A | 7/2000 | Ralston | |
| 7,171,220 B2 * | 1/2007 | Belcea | 455/457 |
| 2003/0036379 A1 * | 2/2003 | Nikolai et al. | 455/414 |
| 2003/0210228 A1 | 11/2003 | Ebersole et al. | |
| 2004/0160909 A1 * | 8/2004 | Sheynblat | 370/328 |
| 2007/0233381 A1 * | 10/2007 | Okeya | 701/213 |
| 2007/0233536 A1 | 10/2007 | Johnson et al. | |
| 2009/0153673 A1 | 6/2009 | Chu et al. | |
| 2009/0219209 A1 * | 9/2009 | Bush et al. | 342/450 |
| 2010/0070165 A1 * | 3/2010 | Kang | 701/201 |
| 2010/0208033 A1 * | 8/2010 | Edge et al. | 348/46 |
| 2010/0222081 A1 * | 9/2010 | Ward et al. | 455/456.3 |
| 2010/0286967 A1 | 11/2010 | Vasilevskiy et al. | |
| 2010/0307016 A1 * | 12/2010 | Mayor et al. | 33/356 |
| 2011/0141254 A1 * | 6/2011 | Roebke et al. | 348/61 |
| 2011/0244892 A1 * | 10/2011 | MacManus et al. | 455/457 |
| 2011/0276556 A1 * | 11/2011 | Meier et al. | 707/706 |
| 2012/0054337 A1 * | 3/2012 | Moritz et al. | 709/224 |
| 2012/0170810 A1 * | 7/2012 | Caduff | 382/103 |

* cited by examiner

*Primary Examiner* — David T Welch
(74) *Attorney, Agent, or Firm* — Fish & Richardson P.C.

(57) ABSTRACT

A computer-implemented method involves obtaining electronic information that indicates a location and direction of aim of a user in a virtual space of an augmented reality application running on a computing device, and determining, with one or more computer processors, factors that represent potential uncertainty in the obtained electronic information. The method also involves generating from the factors a combined level of uncertainty for a focus of the user, the focus representing an item within the user's field of view in the augmented reality application at which the user is directing attention, generating data for making a graphical indication of the level of uncertainty; and providing the data for making the graphical indication of the level of uncertainty for display as an overlay over an image of the field of view in the augmented reality application.

24 Claims, 7 Drawing Sheets

SHOWING UNCERTAINTY IN AN AUGMENTED REALITY APPLICATION

TECHNICAL FIELD

This document relates to augmented reality applications.

BACKGROUND

Augmented reality applications allow a user to see a presentation of the world augmented with or superimposed by computer-generated imagery. The imagery may be graphical or textual. The presented world may be presented directly to the user, such as when the user is looking through a display, and the imagery is applied to or projected on the display. The world may also be presented indirectly, such as when a user is navigating previously captured images of the real world, rather than the world that is presently in front of the user.

Augmented reality is now being implemented on mobile computing devices that include digital cameras. In such implementations, the view that is currently being captured by the camera can be displayed as a scene on a screen of the mobile device, and data about items that are shown in the scene may have textual annotations added to them. Non-visible objects may also be represented by annotations. Thus, for example, a user in a city may hold their smartphone in front of them and may be shown the names of restaurants around them, in the compass direction at which they are currently aiming the camera of their phone. The information may change as a user spins, so that only restaurants that are in front of the user/device are shown at any time. However, it can be difficult to determine precisely where the user is aiming their device, because the camera may simultaneously show multiple items, such as buildings, particularly when the items are at different distances from the user, and thus overlap within the device's field of view.

SUMMARY

This document discusses systems and techniques to indicate uncertainty to a user of an augmented reality application. In particular, when a user directs their view toward a variety of objects, a system may have trouble determining precisely which object the user is directing his or her attention to. It may also be difficult to determine exactly where the user is looking if the position-gathering sensors on the device are imprecise. For example, there may be several feet of uncertainty regarding a user's geographical location when GPS is used to identify the location, and there may be much more uncertainty when Cell ID triangulation and other access point location determination methods are used. Likewise, there may be uncertainty of several degrees regarding a compass direction of the device, and a level of tilt of the device (i.e., is the user looking high in the air or lower down). As a result, the techniques described here may make a determination of the zone that is created when such uncertainties combine so as to prevent the system from knowing exactly where the user is focusing, and the system may generate a visual indicator for presentation to the user so that the user knows how uncertain the system is about the user's intent. The indicator may, for example, be a circle that is centered over the calculated point of interest, and the size of the circle may encompass the other areas that the system have determined could be the user's focus.

The system may layer, on top of this determination of combined measurement error in the system, certain inferences about the user's intended focus point. For example, each of the items that is within the zone of uncertainty can be reviewed and its importance to the user can be determined to decide whether the user's focus is likely to be on that item. For example, if a user frequently searches for coffee shops when traveling, that information can be used to infer that, if a particular coffee shop is within the zone of uncertainty, then the use is likely to be most interested in the item that corresponds to the coffee shop. Similar inferences can be made with respect to general popularity of certain items, e.g., coffee shops can be given a higher weight than are tobacco shops, if it turns out that "coffee shops" is a search term that is used with a search engine much more frequently than the term "tobacco shops." Such an implied point of interest may be displayed to the user so that they can select an icon and immediately be shown that point of interest in preference to others that might otherwise be displayed on the augmented reality application. For example, the zone of uncertainty could be represented by a blue circle while the inferred interest may be shown by a red dot or small circle that is within the blue circle.

In one implementation, a computer-implemented augmented reality method is disclosed. The method comprises obtaining electronic information that indicates a location and direction of aim of a user in a virtual space of an augmented reality application running on a computing device; determining, with one or more computer processors, factors that represent potential uncertainty in the obtained electronic information; generating from the factors a combined level of uncertainty for a focus of the user, the focus representing an item within the user's field of view in the augmented reality application at which the user is directing attention; generating data for making a graphical indication of the level of uncertainty; and providing the data for making the graphical indication of the level of uncertainty for display as an overlay over an image of the field of view in the augmented reality application. The obtained electronic information can include global positioning system data generated by the computing device, and the information that indicates a direction of aim comprises information from a compass and accelerometer on the computing device. The obtained electronic information can also include data from a wireless access point location determination system, and generating data for making a graphical indication comprises generating data for making a visible computer icon whose size reflects the combined level of uncertainty, wherein a larger icon represents a higher level of uncertainty. The size of the icon can be generated so that the icon overlaps with items in the user's field of view that are determined to be the potential focus of the viewer, based on the generated combined level of uncertainty.

In certain aspects, generating data for making a graphical indication comprises generating data to produce one or more user-selectable icons, wherein each icon is displayed over an item in the user's field of view that is within an area defined by the combined level of uncertainty.

In another implementation, a tangible, non-transient recordable storage media is disclosed. The media has recorded thereon instructions, that when executed, perform actions that comprise determining a location and direction of aim of a user in a virtual space of an augmented reality application running on a computing device; obtaining uncertainty data that has been generated by (a) determining, with one or more computer processors, factors that represent potential uncertainty in the obtained electronic information, (b) generating from the factors a combined level of uncertainty for a focus of the user, the focus representing an item within the user's field of view in the augmented reality application at which the user is directing attention, and (c) generating the uncertainty data for making a graphical indication of the level of uncertainty; and using the uncertainty data to make a graphical indication on a display of the computing device, of the level of uncertainty as an overlay over an image of the field of view in the augmented reality application.

In another implementation, a computer-implemented augmented reality system is disclosed. The system comprises one or more position sensors for identifying information that reflects a physical position in space of a computing device, a positional uncertainty computation module programmed to determine a degree of uncertainty regarding a focus point of the computing device in an augmented reality application and to generated data to visually communicate the degree of uncertainty, and an augmented reality application on the computing device programmed to display one or more icons overlaid on a virtual space, wherein the one or more icons visually represent the degree of uncertainty. The one or more position sensors can comprise a global positioning system (GPS) sensor and a compass. Also, the degree of uncertainty can be a combination of error values for each of the one or more position sensors, and can represent an area of an augmented reality application display within which a user's focus cannot be determined. Moreover, the obtained electronic information can include data from a wireless access point location determination system. In addition, the positional uncertainty computation module can further be programmed to generate data for making a visible computer icon whose size reflects the degree of uncertainty, wherein a larger icon represents a higher degree of uncertainty.

In some aspects, the size of the icon is generated so that the icon overlaps with items in the user's field of view that are determined to be the potential focus of the viewer, based on the generated combined level of uncertainty. Moreover, the positional uncertainty computation module can be further programmed to generate data to produce one or more user-selectable icons, wherein each icon is displayed over an item in the user's field of view that is within an area defined by the degree of uncertainty.

In yet another implementation, a computer-implemented augmented reality system is disclosed that comprises one or more position sensors for identifying information that reflects a physical position in space of a computing device; an augmented reality application on the computing device programmed to display one or more icons overlaid on a virtual space that is generated in response to values sensed by the one or more sensors, wherein the one or more icons visually represent the degree of uncertainty; and means for generating the one or more icons in response to information that represents uncertainty in measurement of each of the one or more position sensors.

The details of one or more implementations are set forth in the accompanying drawings and the description below. Other features and advantages will be apparent from the description and drawings, and from the claims.

DETAILED DESCRIPTION

Figure 1:
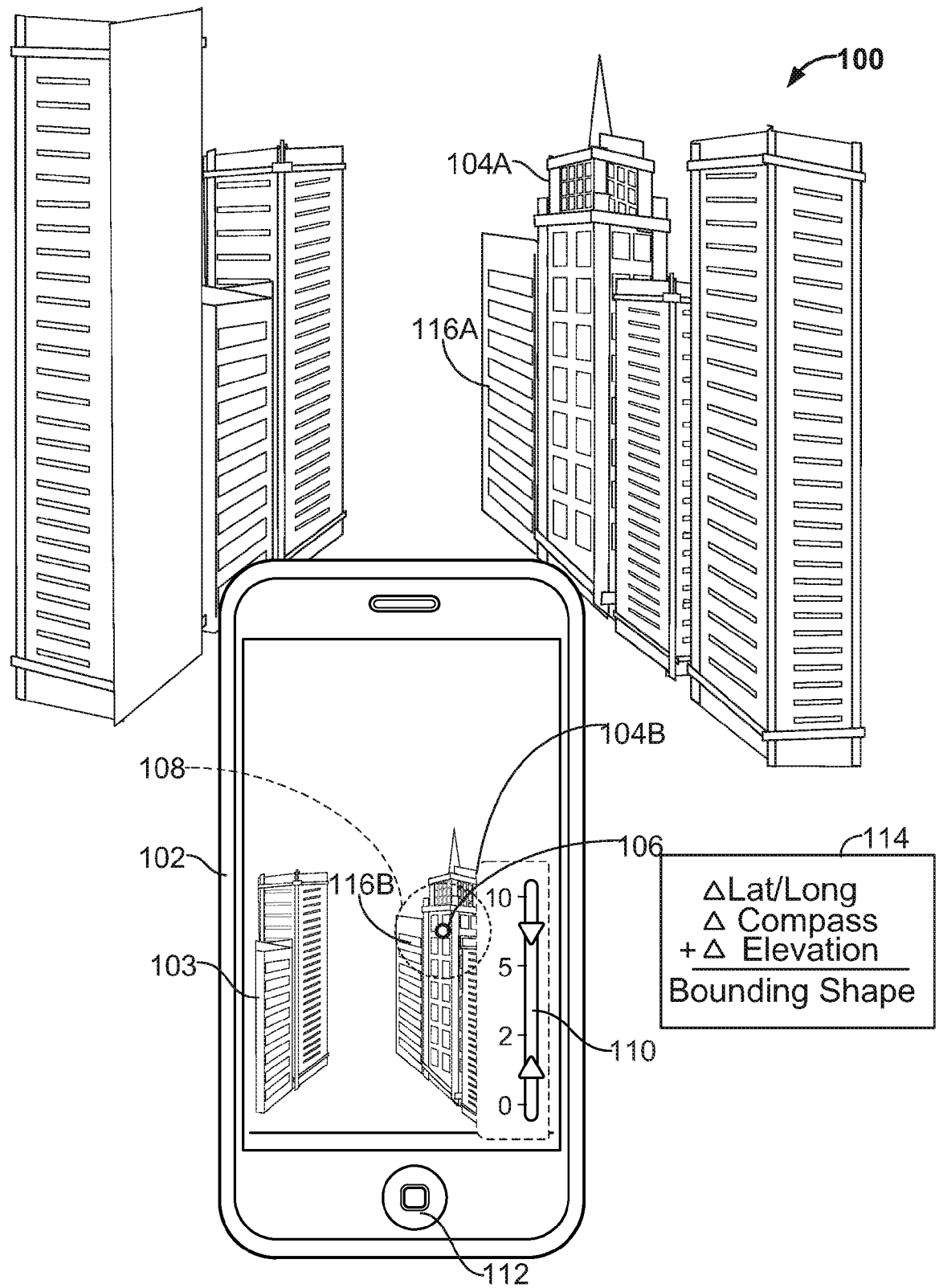
FIG. 1 is a conceptual diagram showing the presentation of items in an augmented reality application along with an indicator of uncertainty regarding the focus of the application.

Referring to FIG. 1, in accordance with some implementations, a system 100 includes a mobile device 102. The mobile device 102 may be provided with a display and camera, along with sensors that can determine a position and orientation of the device, and then use such information to provide an annotated augmented reality display of information being captured by the camera. Where multiple items being captured by the camera are close together or otherwise overlap, the device may indicate how certain it is that the user is interested in one object instead of other objects on the display.

In the example shown, the mobile device 102 is a cellular phone. In other implementations, the mobile device 102 can be a personal digital assistant, a laptop computer, a net book, a camera, a wrist watch, or another type of mobile electronic device. The mobile device 102 includes a camera (not shown) for capturing images, a display screen 103 for displaying graphics, texts, and images, and one or more input keys 112 for receiving user input. In the example depicted in FIG. 1, the display screen 103 is a touch screen capable of receiving user input. For example, a user contacts the display screen 103 using a finger or stylus in order to select items displayed by the display screen 103, enter text, or control functions of the mobile device 102. The one or more input keys 112 can be used to make selections, enter text, return to a home screen, or control functions of the mobile device 102.

In the example depicted, the mobile device 102 is located within a city, facing a number of skyscrapers. The camera of the mobile device 102 captures images of the skyscrapers and displays the images on the display screen 103 in real-time or near real-time, like a preview mode for a video camera. The mobile device 102 includes functionality for determining positional information. For example, the mobile device 102 includes GPS functionality for determining a geographic location of the mobile device 102, a compass for determining a viewing direction of the camera, and an accelerometer for determining a vertical viewing angle of the camera. This information can be used to determine locations that are within the viewing direction and angle of the camera.

In some implementations, positional information (i.e. location, viewing direction, and vertical viewing angle information) is used to identify geo-coded data associated with locations within relative proximity to the mobile device 102. For example, a user of the mobile device 102 enters a search string of "library." The search string, along with positional information obtained by the mobile device 102 can be used to identify libraries that are located within general proximity of the mobile device 102. In some implementations, the mobile device 102 provides a distance control 110 for setting clipping areas. The clipping areas define a range of focus for identifying items of interest. In the example shown, the distance control 110 is presented as a slider that allows the user to select a minimum distance and a maximum distance. For example, a user can set a top slider to 7.5 miles and a bottom slider to 1 mile to indicate that only geo-coded information associated with locations that are greater than 1 mile from the mobile device 102 and less than 7.5 miles from the mobile device 102 should be identified. In other implementations, the distance control 110 can take other forms. For example, the distance control 110 is placed at the top or bottom of the display screen 103. As another example, the distance control 110 includes text fields for the user to manually enter minimum and maximum distance values. As yet another example, the distance control 110 can take the form of a first dial for indicating a minimum distance and a second dial for indicating a maximum distance. In some implementations, the mobile device 102 allows the user to manually set minimum and maximum distances using a map view by dragging visual representations of the minimum and maximum distances.

In the example shown, the user uses the distance control 110 to specify a minimum distance of 1 mile and a maximum distance of 7.5 miles to use when searching for geo-coded information. In some implementations, the mobile device 102 accesses a database of geo-coded data stored on the mobile device 102 and identifies all geo-coded data associated with locations that are greater than 1 mile from the mobile device 102 and less than 7.5 miles from the mobile device 102. In other implementations, the mobile device 102 sends positional information (e.g. location and viewing direction) and distance clipping information (e.g. minimum and maximum distances) to a remote computing device, such as a server. In such implementations, the remote computing device identifies geo-coded data that is associated with locations that are greater than 1 mile from the mobile device 102 and less than 7.5 miles from the mobile device 102. Sending the positional and distance clipping information to the remote computing device can lead to a greater number of geo-code pieces of data being identified since the remote computing device may have access to a larger database of geo-coded data. The remote computing device can also perform searches (e.g. web searches) in order to identify addresses or locations that are within the specified ranges.

In some implementations, the mobile device 102 allows the user to enter search strings or otherwise indicate search terms in order to identify geo-coded data. For example, the user can enter a search string of "movies" in order to cause movie theaters and video rental stores within the specified range to be identified. As another example, the user can enter a string of "homes for sale" in order to cause real estate listings within the specified range to be identified. As yet another example, the user can indicate a category of geo-coded data from a list of categories. Categories can include, for example, fast food restaurants, fine dining restaurants, movie theaters, golf courses, airports, banks, ATMs, post offices, night clubs, hair salons, and retail stores. The mobile device 102 or remote computing device then identifies geo-located data that matches the indicated category and is associated with a location within the specified range.

Still referring to FIG. 1, in the example shown, the mobile device 102 is positioned so that a building 104A is within the viewing scope of the camera of the mobile device 102. Various modules of the mobile device 102 determine latitude and longitude coordinates for the mobile device 102, a viewing direction within the horizontal plane of the mobile device 102, and a vertical viewing angle for the mobile device 102. The mobile device 102 sends this information to a remote computing device along with a request for information on locations within the viewing direction of the mobile device 102. In some implementations, the mobile device 102 will also send minimum and maximum distance values as specified by a user of the mobile device 102 to the remote computing device. In some implementations, the user elects not to set minimum and maximum distance values, or the mobile device 102 does not allow the user to specify minimum and maximum values. In such instances, default values may be used for the minimum and maximum values. For example, a default minimum value of zero and a default maximum value of 20 miles are used.

Still referring to the depicted example, the remote computing device uses the positional information received from the mobile device 102 to identify information associated with locations within the viewing scope of the mobile device 102. For example, the remote computing device can identify information associated with the building 104A. The remote computing device returns the information to the mobile device 102 along with an indication that the information is associated with the location of the building 104A. The mobile device 102 displays an icon 106 on the display screen 103 over an image 104B of the building 104A. In some implementations, the icon 106 is user-selectable. Selecting the icon 106 causes one or more annotations containing information about the building 104A, or businesses located within the building 104A to be displayed. In some implementations, the mobile device 102 allows a user to select from among a variety of categories of information associated with the building 104A. For example, a user may elect to view a listing of restaurants located within the building 104A. As another example, a user may elect to view a listing of clothing stores located within the building 104A. As yet another example, a user may elect to view historical information about the building 104A.

In some implementations, a user enters a search string or otherwise indicates a search term prior to the building 104A being identified and the icon 106 being displayed on the display screen 103. For example, the user enters a search string of "deli." The mobile device 102 sends this search string along with current positional information for the mobile device 102 to the remote computing device. The remote computing device identifies information associated with the building 104A indicating that a deli is located within the building 104A. The remote computing device returns the identified information to the mobile device 102. The mobile device displays the icon 106. In this example, the user selects the icon 106, causing information about the deli to be displayed. The information may include the name of the deli, a phone number, an address, a link to a landing page (e.g., a webpage for the deli), a menu for the deli, operating hours, customer reviews, news articles, or a listing of web search results. In some implementations, selecting the icon 106 causes a map to be displayed on the display screen 103. The map may indicate the current location of the mobile device 102 and the location of the building 104A.

There can be a degree of uncertainty associated with the placement of the icon 106 on the display screen 103. In some instances, uncertainty associated with the placement of the icon 106 is due to uncertainty associated with some or all of the positional information determined by the mobile device 102. For example, if transmission tower triangulation is used to determine a geographic location for the mobile device 102, the results may be less accurate than if GPS signals are used to determine the location of the mobile device 102. In some implementations, transmission tower triangulation is used if the mobile device 102 is not GPS capable, or if the mobile device 102 is located in a dense urban environment and unable to receive GPS signals from satellites. In some implementations, a position determination made using transmission tower triangulation is determined by the mobile device 102. In other implementations, a position determination made using transmission tower triangulation is determined by a wireless access point location determination system. In some instances, transmission tower triangulation may only be able to identify the location of the mobile device 102 to within 3,000 feet, whereas a GPS unit may be able to identify the location of the mobile device 102 to within 10 feet or less. As another example, directional information as determined by a compass of the mobile device 102 may be imprecise. As yet another example, an accelerometer of the mobile device 102 may be able to determine the vertical viewing angle of the mobile device 102 to within 10 degrees, but cannot determine the precise vertical viewing angle.

In some implementations, uncertainty associated with positional information for the mobile device 102 is represented visually on the display screen 103. For example, the building 104A is identified as being within the viewing scope of the mobile device 102. The icon 106 is placed at the center of an area at which the image 104B of the building 104A is believed to be located on the display screen 103. A bounding shape 108 is displayed on the display screen 103 to indicate areas on the display screen 103 that depict locations for which the information associated with the icon 106 may actually relate to. In other words, information associated with the icon 106 may relate to any of the locations on the display screen 103 that fall within the bounding shape 108. For example, a building 116A is located next to the building 104A. A user of the mobile device 102 performs a search for a hair salon. The mobile device 102 or a remote computing device identifies information associated with a hair salon located in the building 116A. Due to uncertainty of the location of the mobile device 102, the icon 106 is positioned over the image 104B of the building 104A rather than over an image 116B of the building 116A. However, because of the uncertainty associated with the location of the mobile device 102, the bounding shape 108 is displayed around the icon 106 to indicate that the salon may be located within any of the areas encompassed by the bounding shape 108. In the example depicted, the ring covers portions the image 116B. This indicates that the salon may be located within the building 116A.

In some implementations, the size of the bounding shape 108 reflects a degree of uncertainty associated with positional information determined by the mobile device 102. For example, the mobile device 102 may contain a highly accurate GPS unit. In this example, the bounding shape 108 will be very small or non-existent in order to indicate that current location information for the mobile device 102 is highly accurate. Continuing with this example, the GPS unit may be blocked from receiving satellite GPS signals, causing the mobile device 102 to resort to using transmission tower triangulation in order to determine the location of the mobile device 102. This causes the bounding shape 108 to appear larger on the display screen 103 since there is a greater degree of uncertainty associated with location information determined using transmission tower triangulation than with location information determined using the GPS unit. In some implementations, the area within the bounding shape 108 is shaded or semi-transparent. In some implementations, a shape other than a circle is used to indicate a range of possible locations for the icon 106. For example, the bounding shape can take the form of a rectangle, oval, or hexagon. In some implementations, the icon 106 changes colors or shades in order to indicate a degree of uncertainty for positional information determined by the mobile device 102. In other implementations, uncertainty associated with a position of the icon 106 is displayed as an uncertainty index. For example, a number from one to one hundred is displayed next to the icon 106 to indicate a level of uncertainty about the position of the icon 106 on the display screen 103, with one hundred representing high certainty and one representing low certainty.

The mobile device 102 or the remote computing device can also identify buildings or objects within images captured by the camera of the mobile device 102 and position the icon 106 based on the identification of the buildings or objects (either alone or with assistance with a remote computer system). For example, the mobile device 102 sends an image of the cityscape shown in FIG. 1 to the remote computing device. The remote computing device uses image recognition software or edge recognition software to determine the outlines of the buildings in the image. Based on the outlines, the remote computing device determines relative positions for the buildings depicted in the image. The remote computing device determines the size and shape of the bounding shape 108 based on uncertainty associated with positional data for the mobile device 102 and positions the bounding shape 108 over the image. The bounding shape 108 indicates locations within the image that may be associated with an identified piece of information. The remote computing device then determines, based on the outlines, that the image 104B of the building 104A takes up the majority of the bounding shape 108. The remote computing device then determines that the icon 106 is to be placed over the image 104B of the building 104A. In other words, the remote computing device snaps the position of the icon to the position of the image 104B based on the outlines of the buildings. The remote computing device then returns indications of the position, shape, and size of the bounding shape 108 and the position of the icon 106 to the mobile device 102 along with specific information about a location associated with the icon 106.

Rather than a circle, the bounding shape 108 can be depicted as an outline of one or more objects within view of the mobile device 102. For example, the outlines of the buildings 104A and 116A as determined by the remote computing device may be combined together in order to create one outlined area that defines the bounding shape 108. In this implementation, an outline of the two building images 104B and 116B is displayed on the display screen 103 as the bounding shape 108 in order to indicate that locations associated with information associated with the icon 106 may be located in either the building 104A or the building 116A. For example, if the user enters a search term of bakery, the mobile device 102 displays the bounding shape 108 as an outline of the images 104B and 116B in order to indicate that an identified bakery is located in either the building 104A or the building 116A.

Still referring to FIG. 1, in accordance with some implementations, a calculation 114 is performed to determine the shape and size of the bounding shape 108. In some implementations, the mobile device 102 uses a degree of imprecision associated with longitude and latitude data for the mobile device 102, a degree of imprecision associated with a compass of the mobile device 102, and a degree of imprecision associated with an accelerometer of the mobile device 102 in order to determine the shape and size of the bounding shape 108. For example, the degree of uncertainty associated with a vertical angle measurement made by an accelerometer of the mobile device 102 is used to determine a vertical dimension of the bounding shape 108. In this example, if the vertical angle measurement is relatively accurate, the vertical dimension of the bounding shape 108 will be relatively small, whereas, if there is a high degree of uncertainty associated with the vertical angle measurement, the vertical dimension of the bounding shape 108 will be relatively large. As another example, if a vertical angle measurement for the mobile device 102 has a high degree of uncertainty and a viewing direction measurement made by a compass of the mobile device 102 has a low degree of uncertainty, the bounding shape 108 takes an oval form having a large vertical length and a shorter horizontal length.

In some implementations, the calculation 114 can involve determining a cone of uncertainty for the mobile device 102. The cone of uncertainty can be visualized as a cone emanating from the mobile device 102. The bounding shape 108 is determined from the cone of uncertainty by taking a cross section of the cone of uncertainty at a distance from the estimated location of the mobile device 102. For example, If the distance between the building 104A and the estimated location of the mobile device 102 is 800 feet, the bounding shape 108 is determined by taking a vertical cross section of the cone of uncertainty at a distance of 800 feet from the mobile device 102. The dimensions of the cone of uncertainty can be dependent on uncertainty associated with positional information for the mobile device 102. For example, if a vertical angle measurement has a low degree of uncertainty and a horizontal viewing direction measurement has a high degree of uncertainty, the cone of uncertainty will have a greater width dimension than it's height dimension.

In such implementations, uncertainty associated with the geographic location of the mobile device 102 affects the size of the bounding shape 108. For example, the mobile device can determine a plurality of possible locations of the mobile device 102 based on uncertainty associated with a location measurement. A relatively accurate location measurement made by the mobile device 102 will lead to a smaller number of possible locations for the mobile device 102 than a relatively inaccurate location measurement. For example, a location measurement based on GPS signals will lead to a smaller number of possible locations for the mobile device 102 than a location measurement based on transmission tower triangulation. When performing the calculation 114, the mobile device determines a location from the plurality of possible locations that is furthest from a object, building, or location of interest. For example, the mobile device 102 identifies a location from the plurality of possible locations for the mobile device 102 that is furthest from the building 104A. In this example, the cone of uncertainty for the mobile device 102 is determined as emanating from the identified furthest location. A cross section of the cone of uncertainty is taken where the cone of uncertainty meets the object of interest (e.g. the building 104A) in order to define the bounding shape 108. As can be inferred from this example, the further the identified furthest location is from the building 104A, the larger the bounding shape 108 is. Therefore, a higher degree of uncertainty associated with a location measurement will lead to a larger bounding shape 108 than a lower degree of uncertainty.

The bounding shape 108 can also define a zone of uncertainty. The zone of uncertainty indicates the mobile device 102's degree of uncertainty with regard to an intended focus point of the user of the mobile device 102. In such implementations, the areas of the display screen 103 that are within the bounding shape 108 are determined as being possible intended focus points for the user. For example, the user starts an augmented reality application of the mobile device 102. The augmented reality application displays images taken by the camera of the mobile device 102 in real-time or near real-time on the display screen 103. The annotations or icons associated with locations within the viewing direction of the mobile device 102 are overlaid on the images. For example, the icon 106 is displayed on the display screen 103. The user selects an area of the display screen 103 that is located within the area of uncertainty (e.g., within the bounding shape 108). The mobile device 102 displays a list of multiple geo-coded data items that are associated with locations within the area of uncertainty in response to the user selection.

The mobile device 102 can list the geo-coded data items in order of relevance to the user. In some such implementations, the mobile device 102 uses historic searching data and user profile information associated with the user to determine an order of relevance. For example, the user may have previously searched for ATMs when using the augmented reality application. In this example, the mobile device 102 would list an indication of an ATM being located within the zone of uncertainty above an indication of a toy store being located within the zone of uncertainty. As another example, user profile information for the user indicates that the user prefers sandwiches to Chinese food. The mobile device 102 displays a data item associated with a deli over a data item associated with a Chinese restaurant based on the user profile information. As another example, general search information collected from searches performed by a broad group of people indicates that people generally search for public transit stops more often than wig stores. In this example, the mobile device 102 lists a data item associated with a subway stop above a data item associated with a wig store. In some implementations, selecting the icon 106 results in only the most relevant data item, as determined by the mobile device 102, to be displayed. In contrast, selecting elsewhere within the bounding shape 108 causes a listing of all geo-coded data items associated with locations within the zone of uncertainty to be displayed.

Figure 2:
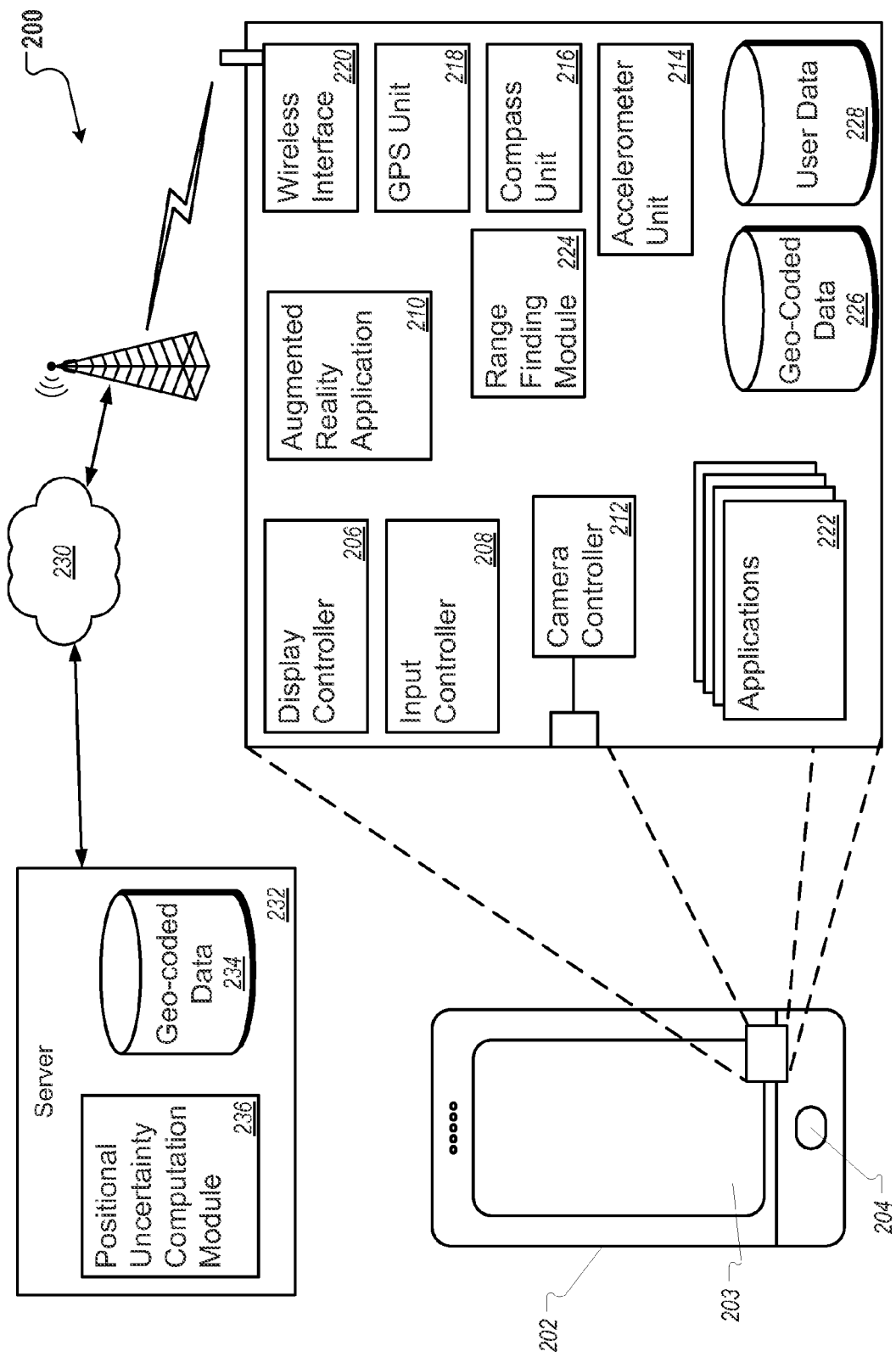
FIG. 2 is a schematic diagram of a system for interacting with a user by way of an augmented reality application on a mobile device.

Referring now to FIG. 2, in accordance with some implementations, a communications system 200 includes a mobile device 202. In the example shown, the mobile device 202 is a cellular phone. In other implementations, the mobile device 202 can be a personal digital assistant, a laptop computer, a net book, a camera, a wrist watch, or another type of mobile electronic device. The mobile device 202 includes a camera (not shown) and a display screen 203 for displaying text, images, and graphics to a user, including images captured by the camera. In some implementations, the display screen 203 is a touch screen for receiving user input. For example, a user contacts the display screen 203 using a finger or stylus in order to select items displayed by the display screen 203, enter text, or control functions of the mobile device 202. The mobile device 202 further includes one or more input keys such as a track ball 204 for receiving user input. For example, the track ball 204 can be used to make selections, return to a home screen, or control functions of the mobile device 202. As another example, the one or more input keys includes a click wheel for scrolling through menus and text.

The mobile device 202 includes a number of modules for controlling functions of the mobile device 202. The modules can be implemented using hardware, software, or a combination of the two. The mobile device 202 includes a display controller 206, which may be responsible for rendering content for presentation on the display screen 203. The display controller 206 may receive graphic-related content from a number of sources and may determine how the content is to be provided to a user. For example, a number of different windows for various applications 222 on the mobile device 202 may need to be displayed, and the display controller 206 may determine which to display, which to hide, and what to display or hide when there is overlap between various graphical objects. The display controller 206 can include various components to provide particular functionality for interacting with displayed components, which may be shared across multiple applications, and may be supplied, for example, by an operating system of the mobile device 202.

An input controller 208 may be responsible for translating commands provided by a user of mobile device 202. For example, such commands may come from a keyboard, from touch screen functionality of the display screen 203, from trackball 204, or from other such sources, including dedicated buttons or soft buttons (e.g., buttons whose functions may change over time, and whose functions may be displayed on areas of the display screen 203 that are adjacent to the particular buttons). The input controller 208 may determine, for example, in what area of the display commands are being received, and thus in what application being shown on the display the commands are intended for. In addition, it may interpret input motions on the touch screen 203 into a common format and pass those interpreted motions (e.g., short press, long press, flicks, and straight-line drags) to the appropriate application. The input controller 208 may also report such inputs to an event manager (not shown) that in turn reports them to the appropriate modules or applications. For example, a user viewing an options menu displayed on the display screen 203 selects one of the options using one of the track ball 204 or touch screen functionality of the mobile device 202. The input controller 208 receives the input and causes the mobile device 202 to perform functions based on the input.

A variety of applications 222 may operate, generally on a common microprocessor, on the mobile device 202. The applications 222 may take a variety of forms, such as mapping applications, e-mail and other messaging applications, image viewing and editing applications, video capture and editing applications, web browser applications, music and video players, and various applications running within a web browser or running extensions of a web browser.

A wireless interface 220 manages communication with a wireless network, which may be a data network that also carries voice communications. The wireless interface 220 may operate in a familiar manner, such as according to the examples discussed below, and may provide for communication by the mobile device 202 with messaging services such as text messaging, e-mail, and telephone voice mail messaging. In addition, the wireless interface 220 may support downloads and uploads of content and computer code over a wireless network.

A camera controller 212 of the mobile device 202 receives image data from the camera and controls functionality of the camera. For example, the camera controller 212 receives image data for one or more images (e.g. stationary pictures or real-time video images) from the camera and provides the image data to the display controller 206. The display controller 206 then displays the one or more images captured by the camera on the display screen 203. As another example, the camera includes physical zoom functionality. In this example, the camera controller 212 receives input from a user via the input controller 208 and causes the camera to zoom in or out based on the user input. As yet another example, the camera controller 212 controls auto focus functionality of the camera.

The mobile device 202 further includes an augmented reality application 210. The augmented reality application 210 displays information and images associated with locations within relative proximity of the mobile device 202. The information and images are displayed as annotations overlaid on top of real-time or pseudo real-time images captured by the camera. For example, a user of the mobile device 202 directs the camera towards a building. The camera controller 212 receives image data from the camera and provides the image data to the display controller 206. The display controller 206 causes the display screen 203 to display images of the building captured by the camera in real-time. The augmented reality application 210 communicates with the display controller 206 to cause information associated with the building to be displayed on or near the real-time images of the building displayed on the display screen 203. In some implementations, information associated with the building includes the name of the building, the address of the building, businesses located within the building, or historical information about the building.

Still referring to FIG. 2, in accordance with some implementations, the augmented reality application 210 uses a GPS Unit 218 of the mobile device 202 to determine the location of the mobile device 202. For example, the GPS Unit 218 receives signals from one or more global positioning satellites. The GPS Unit 218 uses the signals to determine the current location of the mobile device 202. In some implementations, rather than the GPS Unit 218, the mobile device 202 includes a module that determines a location of the mobile device 202 using transmission tower triangulation or another method of location identification. In some implementations, the mobile device 202 uses location information that is determined using the GPS Unit 218 to identify geo-coded information that is associated with the location of the mobile device 202. In such implementations, location information obtained or determined by the GPS Unit 218 is provided to the augmented reality application 210. In some implementations, the augmented reality application 210 uses the location information to identify geo-coded data 226 stored on the mobile device 202.

The geo-coded data 226 includes information associated with particular geographic locations. For example, geo-coded data can include building names, business names and information, historical information, images, video files, and audio files associated with a particular location. As another example, geo-coded data associated with a location of a park may include hours for the park, the name of the park, information on plants located within the park, information on statues located within the park, historical information about the park, and park rules (e.g. "no dogs allowed"). The augmented reality application 210 can use the current location of the mobile device 202 to identify information associated with geographic locations that are in close proximity to the location of the mobile device 202. In some implementations, the geo-coded data 226 is stored on a memory of the mobile device 202, such as a hard drive, flash drive, or SD card. In some implementations, the mobile device 202 may contain no pre-stored geo-coded data. In some implementations, none of the geo-coded data 226 stored on the mobile device 202 is associated with locations within relative proximity to the current location of the mobile device 202.

In some implementations, the augmented reality application 210 uses the wireless interface 220 to obtain geo-coded data from a remote server 232 through a network 230. In such implementations, augmented reality application 210 provides the current location of the mobile device 202 to the wireless interface 220 which in turn transmits the current location to the remote server 232 through the network 230. The remote server 232 accesses a database of geo-coded data 234 and identifies geo-coded data associated with locations within a predetermined proximity of the current location of the mobile device 202. For example, the remote server 232 may identify all geo-coded data 226 that is associated with locations within five miles of the current location of the mobile device 202. The remote server 232 then returns the identified geo-coded data to the mobile device 202 through the network 230.

The augmented reality application 210 utilizes a compass unit 216 of the mobile device 202 to determine a current viewing direction, within the horizontal plane, of the camera. In other words, the compass unit 216 determines a direction in which a user of the mobile device 202 is looking while using the augmented reality application 210. Viewing direction information provided by the compass unit 216 can be used to determine a current viewing scope of the camera. In some implementations, the augmented reality application 210 will provide viewing direction information obtained from the compass unit 216 to the remote server 232 using the wireless interface 220. In such implementations, the remote server 232 uses the viewing direction information to further narrow the amount of geo-coded data 234 identified as relevant geo-coded data. For example, the remote server 232 will identify only geo-coded data that are associated with locations within relative proximity to the current location of the mobile device 202 and within a viewing scope defined by the viewing direction information as being relevant. The remote server 232 then transmits the identified relevant geo-coded data to the mobile device 202.

In other implementations, the remote server 232 does not use viewing direction information to determine relevant geo-coded data. In such implementations, the remote server 232 identifies geo-coded data associated with locations within relative proximity to the mobile device 202. The mobile device 202 then stores the geo-coded data received from the remote server 232 as a portion of the geo-coded data 226. The augmented reality application 210 uses the current viewing direction information provided by the compass unit 216 to identify geo-coded data received from the remote server 232 that is within the current viewing scope of the camera. The augmented reality application 210 uses the identified geo-coded data to create annotations and, in conjunction with the display controller 206, overlays the annotations over real-time or pseudo real-time images captured by the camera and displayed on the display screen 203. The augmented reality application 210 further uses the viewing direction information and the location information to determine positions on the screen where the annotations are to be positioned. For example, the augmented reality application 210 uses geo-coded data to generate several annotations which include business names and descriptions. The annotations are placed over images of the buildings in which the businesses are located within the images captured by the camera.

In some implementations, the mobile device 202 further includes an accelerometer unit 214 for determining a vertical angle of the mobile device 202. In some implementations, vertical angle information generated by the accelerometer unit 214 is provided to the remote server 232 and used to further narrow the geo-coded data that is identified by the remote server 232 and provided to the mobile device 202. In other implementations, the vertical angle information is used by the augmented reality application 210 to identify geo-coded data that is currently within the view of the camera from among a larger set of geo-located data provided by the remote server 232. In some implementations, the augmented reality application 210 uses vertical angle information to more accurately position annotations over images captured by the camera and displayed on the display screen 203.

For example, a user may position the mobile device 202 so that the vertical viewing angle of the camera is generally horizontal. The augmented reality application 210 uses location, viewing direction, and vertical angle information to create annotations and place the annotations over images captured by the camera. Still following this example, the user then changes the vertical angle of the mobile device 202 so that the camera is facing a direction that is 45 degrees above horizontal, without changing the geographic location or horizontal viewing direction of the mobile device 202. The change in vertical angle can cause the augmented reality application 210 to change the position of annotations on the display screen 203 as well as change what annotations are displayed. For example, annotations associated with buildings that are no longer in view after the vertical angle of the mobile device 202 is changed can be removed from the display. As another example, changing the vertical angle may cause additional buildings, such as sky scrapers, to come into view. The augmented reality application 210 can generate annotations based on geo-located data associated with the locations of the buildings and place the newly generated annotations on the display screen 203 over images of the additional buildings.

The mobile device 202 optionally includes a range finding module 224 for determining the distance between the mobile device 202 and buildings or objects depicted in images captured by the camera. For example, the mobile device 202 can include a laser range finder for sending and receiving laser pulses. The laser range finder sends a laser pulse which can reflect off of a building or object. The reflected laser pulse is then received by the laser range finder. The range finding module 224 can control the laser range finder and calculate the amount of time between when the laser pulse is sent and when the reflected laser pulse is received. This time differential can be used to calculate the distance between the mobile device 202 and the building or object off of which the laser pulse is reflected. In some implementations, triangulation, sonar, radar, stadiametric, or coincidence rangefinders can be used to determine distance between the mobile device 202 and buildings or objects within view of the camera.

In some implementations, the augmented reality application 210 uses distance measurements provided by the range finding module 224 along with location, viewing direction, and vertical angle data to more accurately determine which objects and buildings are within the view of the camera. For example, the augmented reality application 210 can use distance measurement information to determine the geographic location of a building within view of the camera, based on the location of the mobile device 202. The augmented reality application 210 can then use the geographic location of the building to request more accurate geo-coded data from the remote server 232 or to better filter geo-coded data received from the remote server 232 to more accurately ensure that only data associated with the location of the building is shown as annotations over the building within images displayed on the display screen 203.

In some implementations, information about buildings, objects, or locations that are not within immediate view of camera are displayed as annotations. For example, the only object within immediate view of the camera may be a brick wall. The augmented reality application 210 generates annotations for businesses, buildings, and locations that are within relative proximity to the mobile device 202 and in the viewing direction of the mobile device 202, but not within the immediate view of the camera. The augmented reality application 210 can cause annotations to be placed on the display screen 203 to indicate the general directions of the locations associated with the annotations. In some implementations, the annotations can include distances to indicate how far away particular businesses or locations are located. For example, an annotation can read "Metro: 0.8 miles" to indicate that a Metro stop is 0.8 miles away in the general direction of where the annotation is located on the screen. As another example, an annotation can read "Schaper Park: 1.1 mile" to indicate that Schaper Park is located 1.1 mile away.

In some implementations, in addition to location or positional data, the augmented reality application 210 can use search terms, key words, or user preferences to identify geo-coded information to display as annotations. For example, a user can enter in a search string or otherwise indicate a search term of "pizza." In some implementations, the augmented reality application 210 supplies the search string along with location and viewing direction data to the remote server 232. The remote server then returns geo-coded data related to pizza places in relative proximity to the mobile device 202 and within the viewing direction of the mobile device 202. In other implementations, the mobile device 202 receives a large set of geo-coded data associated with locations in relative proximity to the mobile device 202. The augmented reality application 210 then uses the search string to identify geo-coded data within the large set of geo-coded data that is associated with pizza places. The augmented reality application 210 can then generate annotations that include information about the pizza places which can be displayed on the display screen 203. A user of the mobile device 202 can then select one of the annotations to bring up additional information about the selected pizza place or to call the pizza place.

Still referring to FIG. 2, in accordance with some implementations, the mobile device 202 includes user data 228. The user data 228 can include user preferences or other information associated with a user of the mobile device 202. For example, the user data 228 can include a list of contacts. Some of the contacts may be associated with addresses. If an address associated with a contact is in relative proximity to the mobile device 202 and within the viewing range of the camera, the augmented reality application 210 can provide an annotation showing information about the contact. For example, the augmented reality application 210 can create an annotation that includes the text "Dave: work" to indicate that the contact "Dave" has a work address within the viewing direction of the camera. Following this argument, the user can select a portion of the annotation displayed on the display screen 203 to bring up information about Dave, call Dave, or to generate a text message or e-mail addressed to Dave.

As another example, user data 228 includes notes or images created by a user and associated with a particular location. For example, the user can use the camera to take a picture. The user than stores the picture on the mobile device 202 and associates the picture with GPS coordinates of where the picture was taken. The augmented reality application 210 can later access the stored picture and display the picture as an annotation when the mobile device 202 is in relative proximity to the location associated with the picture and the location is within the viewing direction of the camera. As another example, the user can write notes about a restaurant. The augmented reality application 210 can later create and display an annotation which includes the notes about the restaurant when the address of the restaurant is within relative proximity to the mobile device 202 and within the viewing direction of the camera.

In some implementations, the user data 228 includes indications of user preferences. For example, historical searching data associated with a user of the mobile device 202 may indicate that the user has an interest in museums and art. In this example, the augmented reality application 210 elects to display geo-coded information related to museums, art galleries, art stores, and public art (i.e. statues, murals, etc.) that are within the viewing range of the mobile device 202 when the user has not indicated a specific search string. As another example, the user data 228 may indicate a historical preference for Italian food. The augmented reality application 210 can create and present annotations associated with Italian restaurants within viewing range of the mobile device 202 when the user has not indicated a specific search string.

Still referring to FIG. 2, in accordance with some implementations, a degree of uncertainty may exist with respect to values determined by the GPS unit 218, the compass unit 216, the accelerometer unit 214, or the range finding module 224. For example, if the mobile device 202 is located in a dense urban area, the GPS unit 218 may be unable to receive GPS signals from satellites. In such situations, the mobile device 202 may use transmission tower triangulation in order to determine a present location for the mobile device 202. Since location determinations made using transmission tower triangulation are generally less accurate than location determinations made using GPS satellite signals, a degree of uncertainty is associated with a location determination that relies on transmission tower triangulation. This can lead to uncertainty in determining what objects, buildings, or locations are actually within the viewing scope of the camera of the mobile device 202.

In some implementations, the server 232 includes a positional uncertainty computing module 236 for determining an uncertainty zone based on uncertainty associated with positional information received from the mobile device 202. In some implementations, the uncertainty zone takes the form of a visual depiction of positional uncertainty. The uncertainty zone indicates areas of an image in which a location associated with a geo-coded item could possibly be located, based on uncertainty of the positional information. For example, the mobile device 202 captures an image and transmits the captured image and positional information to the server 232. The server 232 identifies geo-coded data items from the store of geo-coded data 234 that is associated with a building believed to be within the viewing range of the mobile device 202 based on positional information determined by the GPS unit 218, the compass unit 216, and the accelerometer unit 214. The server 232 determines a position for an icon associated with the geo-coded data items on the display screen 203. In some implementations, a user can select the icon in order to cause the annotation to be displayed. The position for the icon as determined by the server 232 is a position within the captured image that the server 232 believes corresponds to a location a building within the image that is associated with the geo-coded data items. In this example, due to uncertainty of the location information determined by the GPS unit 218, the positional uncertainty computing module 236 determines a size, shape, and position of an uncertainty zone for the geo-coded data items. The uncertainty zone covers areas of the image in which the building associated with the geo-coded items could possibly be located, based on a determined uncertainty of the location information. In some implementations, the uncertainty zone is shaded, or semi-transparent, so that portions of the image captured by the camera are partially visible. The uncertainty zone can take the form of circle, rectangle, hexagon, or other shape. In some implementations, the uncertainty zone is centered around the icon. In some implementations, selecting within the uncertainty zone will cause annotations derived from the geo-coded data items to be displayed.

In some implementations, the degree of uncertainty associated with a measurement affects the size of the uncertainty zone. For example, a larger degree of uncertainty associated with a location measurement made by the GPS unit 218 will cause the uncertainty zone to be larger than if the degree of uncertainty associated with the location measurement were relatively small. As another example, if the accelerometer unit 214 is relatively more accurate than the compass unit 216, then vertical angle measurements will have a lower degree of uncertainty than horizontal viewing direction measurements. In such instances, the positional uncertainty computing module 236 determines a height for the uncertainty zone that is smaller than the width of the uncertainty zone to reflect that the vertical viewing direction is relatively accurate, whereas the horizontal viewing direction is less accurate. The server 232 transmits size, shape, and position information for the uncertainty zone as determined by the positional uncertainty computing module 236 to the mobile device 202 through the network 230 along with information derived from the identified geo-coded data items. The mobile device 202 displays the uncertainty zone overlaid on the captured image. In some implementations, the positional uncertainty computing module 236 is located on the mobile device 202. In some implementations, the functions of the positional uncertainty computing module 236 are performed by the augmented reality application 210.

Figure 3:
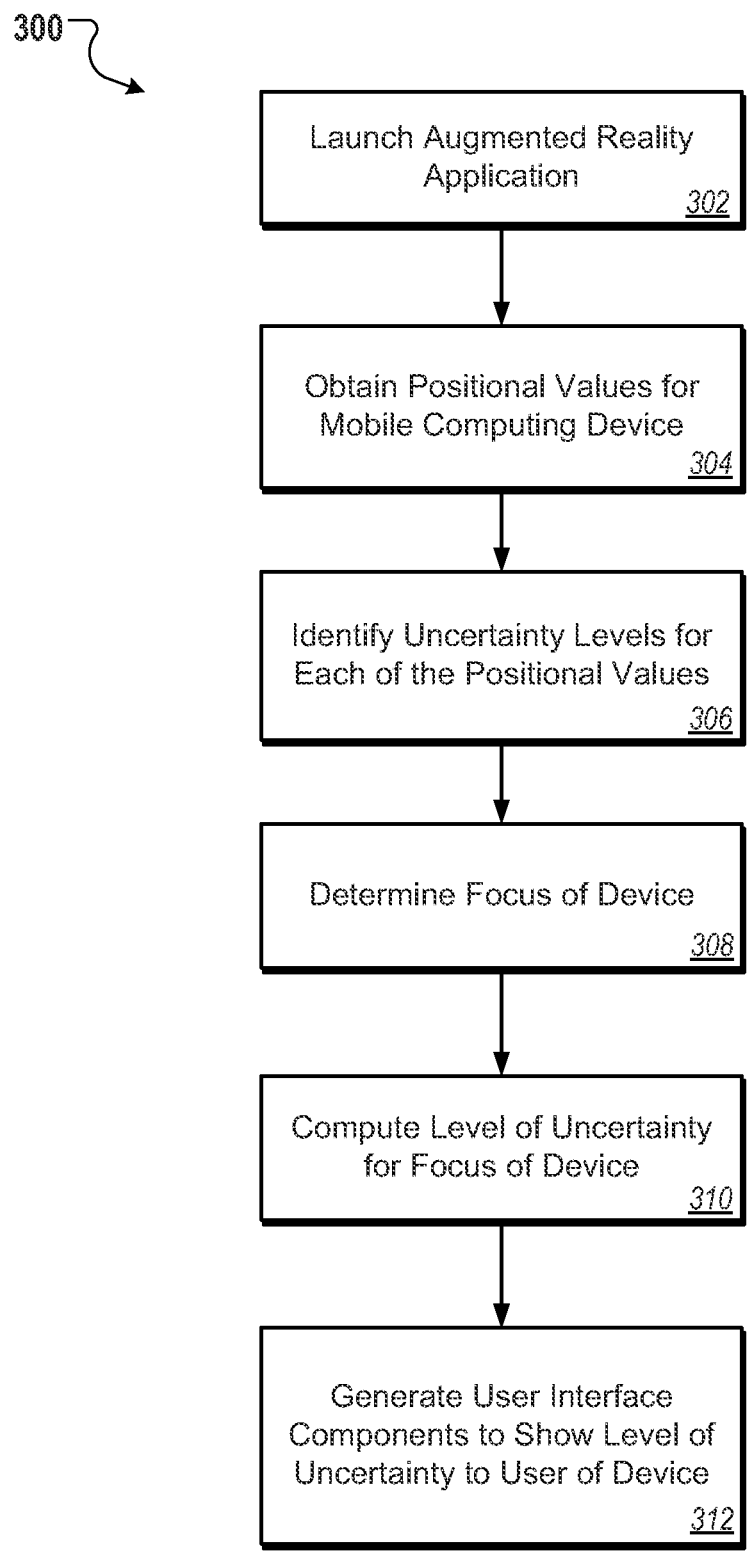
FIG. 3 is a flow chart showing a process for identifying uncertainty in focus of an augmented reality application.

FIG. 3 shows a flow chart of a process 300 for identifying uncertainty in focus of an augmented reality application. In some implementations, the process 300 is performed by a client device. An augmented reality program of the client device obtains positional values (e.g. location, viewing direction, etc.) and identifies a level of uncertainty associated with each of the positional values. The augmented reality program then determines an area that includes possible points of focus for a user of the client device. A visual representation of this area is then displayed to the user.

Step 302 of the process 300 launches the augmented reality application. For example, referring to FIG. 1, a user of the mobile device 102 can use touch screen functionality of the display screen 103 to scroll through a list of applications and select an augmented reality application. This causes the mobile device 102 to execute the augmented reality application.

Step 304 obtains positional values for a mobile computing device. For example, referring to FIG. 2, the GPS unit 218 determines latitude and longitude values for the current position of the mobile device 202, the compass unit 216 determines a current viewing direction within the horizontal plane of the mobile device 202, and the accelerometer unit 214 determines a vertical viewing angle of the mobile device 202. In some implementations, the range finding module 224 optionally determines the distance between the mobile device 202 and an object within the viewing scope of the mobile device 202.

Step 306 identifies uncertainty levels for each of the positional values. For example, referring to FIG. 2, a level of uncertainty for the GPS unit 218 is determined based on specifications for the GPS unit 218 or on past location measurements made by the GPS unit 218. In this example, specifications for the model of the GPS unit 218 may indicate that the GPS unit 218 is accurate to within a range of ten feet. As another example, a degree of accuracy of the accelerometer unit 214 is determined based on past vertical angle measurements made by the accelerometer unit 214. In this example, the degree of accuracy of the accelerometer unit 214 is determined to be within a range of 5 degrees. As yet another example, uncertainty levels for measurements made by the compass unit 216 are determined based on a location of the mobile device 202. For example, compass readings within a dense urban area may be less accurate than compass readings in an uninhabited area. A degree of uncertainty associated with a direction measurement of the compass unit 216 is determined based on known levels of uncertainty for compass readings associated with a particular geographic location.

The computation of uncertainty levels for the positional values can be performed by the mobile computing device or by a remote server. In some instances, known uncertainty values associated with different positional value measuring components are retrieved from a remote database.

Step 308 determines focus for the mobile computing device. For example, referring to FIG. 1, the mobile device 102, or a remote computing device in communication with the mobile device 102, determines the focus of a user of the mobile device 102. Positional information, such as geographic location, horizontal viewing direction, and vertical viewing angle, are used to determine a point of focus for the mobile device 202. In the example shown, the building 104A is identified as the point of focus. The mobile device 102 indicates that the building 104A has been determined as the point of focus by displaying the icon 106 over the image 1048 of the building 104A. In some implementations, an object or building believed to be located at or near the center of an image captured by the mobile device 102 is identified as the point of focus. In such instances, the object or building that is believed to be located at or near the center of the image is determined using positional information. In some implementations, an object or building believed to be within the viewing direction of the mobile device 102 that is associated with geo-coded data items matching a search term indicated by the user is identified as the point of focus. In some implementations, a geo-coded data item that is deemed to be of high interest to the user and within the viewing direction of the mobile device 102 is identified and a location, object, or building associated with the geo-coded data item is identified as the point of focus. The geo-coded data item may be identified as being of high interest based on past searches performed by the user of the mobile device 102, user profile data associated with the user, or general search information derived from a large number of users.

Step 310 computes a level of uncertainty for the focus of the mobile computing device. The level of uncertainty for the focus is based on uncertainty levels for positional values as identified at step 306. For example, referring to FIG. 2, if the uncertainty level of a geographic location measurement made by the GPS unit 218 is five feet, the level of uncertainty associated with the focus will be lower than if the uncertainty level of the geographic location measurement is 1,000 feet. As another example, a high degree of uncertainty with regard to a vertical angle measurement made by the accelerometer unit 214 will lead to a high level of uncertainty with regard to a vertical position of the point of focus. As yet another example, a highly accurate direction measurement made by the compass unit 216 will lead to a low level of uncertainty for a horizontal position of the point of focus.

Step 312 generates user interface components to show the level of uncertainty to a user of the mobile computing device. For example, referring to FIG. 1, the mobile device 102 displays the icon 106 over the captured image to represent the identified point of focus. The mobile device 102 visually displays the level of uncertainty computed at step 310 using the bounding shape 108. The icon 106 represents a position within the captured image that is believed to be the focus of the user of the mobile device 102. The bounding shape 108 surrounds areas of the captured image that could be the focus of the user, based on uncertainty levels for each of the positional values as identified at step 306. In the example shown in FIG. 1, the building 104A is believed to be the focus point of the user. However, a portion of the image 116B is located within the bounding area 108. This indicates that the building 116A could possibly be the point of focus of the user. In some implementations, selecting within the bounding shape 108 causes a list of data items associated with locations within the bounding shape 108 to be displayed. In some implementations, selecting the icon 106 causes a data item identified as a most relevant data item to be displayed.

In some implementations, user interface components used to show the level of uncertainty to a user of the mobile computing device can take forms other than a bounding shape. In some implementations, the mobile device displays an icon over each building or object within view of the mobile device that could possibly be a point of focus for the user. In some such implementations, the user selects one of the icons to indicate which object is the actual point of focus. In other implementations, the mobile devices shades portions of an image corresponding to objects or buildings that could possibly be a point of focus for the user. In such implementations, the shading for an object that has been deemed a more likely focus point can be darker than shading for an object that is deemed a less likely focus point.

In some implementations, the steps of the process 300 can be performed in a different order than that shown. For example, the focus of the mobile computing device can be determined before the uncertainty levels for each of the positional values is identified.

Figure 4:
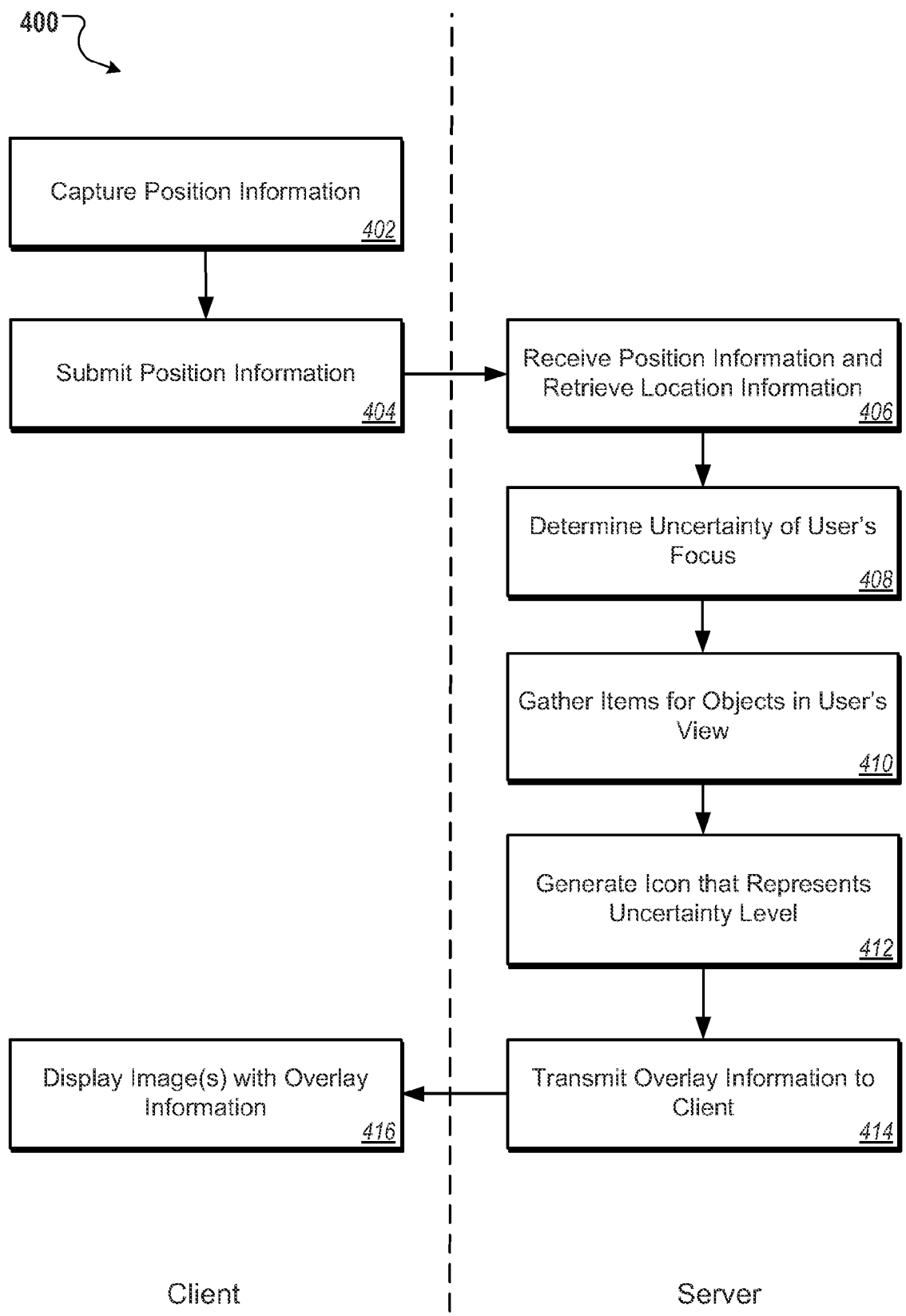
FIG. 4 is a swim lane diagram showing actions performed by an example client and server for controlling the display of augmented reality items.

FIG. 4 is a swim lane diagram 400 diagram showing actions performed by an example client and server for controlling the display of augmented reality items. Step 402 captures position information. For example, the client device includes a module for determining a geographic location of the client device based on transmission tower triangulation. In some implementations, the geographic location is identified as geographic area defined by a plurality of latitude and longitude coordinates. In this example, the client device further includes a compass for determining a viewing direction of the mobile device within the horizontal plane and an accelerometer for determining a vertical viewing direction of the client device.

Step 404 submits the position information. For example, referring to FIG. 2, the mobile device 202 uses the wireless interface 220 to transmit position information to the server 232 using the network 230. In some implementations, the mobile device 202 transmits one or more search terms to the server 232 along with the position information.

Step 406 receives position information and retrieves location information. For example, referring to FIG. 2, the server 232 receives position information from the mobile device 202 through the network 230. The server 232 retrieves geographic location information from the position information received from the mobile device 202. As another example, the server can retrieve location information for the client device from one or transmitters (e.g. cell phone towers, wireless access points, communications transmission towers etc.) in communication with the client device, or located near the client device. The server can estimate a general geographic location for the client device based on the locations of the transmitters located near the client device using triangulation. In some implementations in which the server estimates a geographic location for the client device using the location of one or more transmitters, the server may not receive any geographic location information from the client device. In such implementations, the client device may only transmit horizontal viewing direction and vertical viewing angle information to the server.

Step 408 determines an uncertainty of a user's focus. The server determines a focus point or focus area of the user based on the position information. In some implementations, a degree of uncertainty is associated with determining a focus point or focus are for the user. For example, server identifies two or more objects within the viewing scope of the client device as possible focus points. In this example, the server identifies one object as being the most likely focus point and identifies other objects as being less likely focus points. In some implementations, a focus point probability value is assigned to each object to indicate a probability that the associated object is the focus point of the user.

In some implementations, the uncertainty associated with the user's focus comes from uncertainty in one or more positional measurements. For example, in implementations in which the server estimates a geographic location for the client device using the location of one or more transmitters, the determination of the location of the client device will have a greater degree of uncertainty than if a GPS unit of the client device is used to determine the location of the client device. As another example, a known degree of uncertainty for a particular type of compass included in the client device creates uncertainty in determining a user's focus.

Step 410 gather's items for objects in the user's view. For example, referring to FIG. 2, the server 232 accesses the geo-coded data 234 and identifies geo-coded data items that are associated with locations within the user's view, based on positional information received from the mobile device 202. In some implementations, the server will gather only those geo-coded data items that are associated with a location or locations that have been determined to be probable focus points of the user. In other implementations, the server will identify geo-coded data items for all locations within the user's view. In yet other implementations, the server will identify geo-coded data items for locations within a viewing direction of the client device up to a specified distance. In some implementations, the server will generate annotations based on information contained in the geo-coded data items. In some implementations, the server will perform one or more searches (e.g. database searches, web searches) to identify additional information associated with locations within the user's view.

Step 412 generates one or more icons that represent an uncertainty level. For example, referring to FIG. 1, the server generates the bounding shape 108 for display on the mobile device 102. The bounding shape 108 identifies an uncertainty level of the user's focus by indicating areas of the captured image that are probably focus points for the user. As another example, the server indicates that icons are to be displayed over the images 104B and 116B to indicate that the buildings 114A and 116A are probable focus points of the user.

Step 414 transmits overlay information to the client. For example, referring to FIG. 1, after determining where to position the icon 106 and the bounding shape 108 on the display screen 103, the server transmits information about the size, shape, color, shading, and position of the icon 106 and the bounding shape 108 to the mobile device 102. As another example, referring to FIG. 2, the server 232 determines a position and shape for a shaded area to be displayed on the display screen 203. The server 232 transmits the position and shape information to the wireless interface 220 of the mobile device 202 through the network 230.

Step 416 displays one or more images with the overlay information. For example, referring to FIG. 1, the mobile device 102 captures and displays images of the cityscape. The mobile device 102 uses overlay information received from the server to position the bounding shape 108 and the icon 106 over the captured images. The mobile device 102 positions the bounding shape 108 and the icon 106 according to overlay position information received from the server. In some implementations, the overlay information also specifies color, shape, and shading for the bounding shape 108 and the icon 106.

In some implementations, the steps shown in the swim lane diagram 400 can be performed in a different order than that shown. In some implementations, steps performed by the server may be performed by the client and vice-versa.

Figure 5:
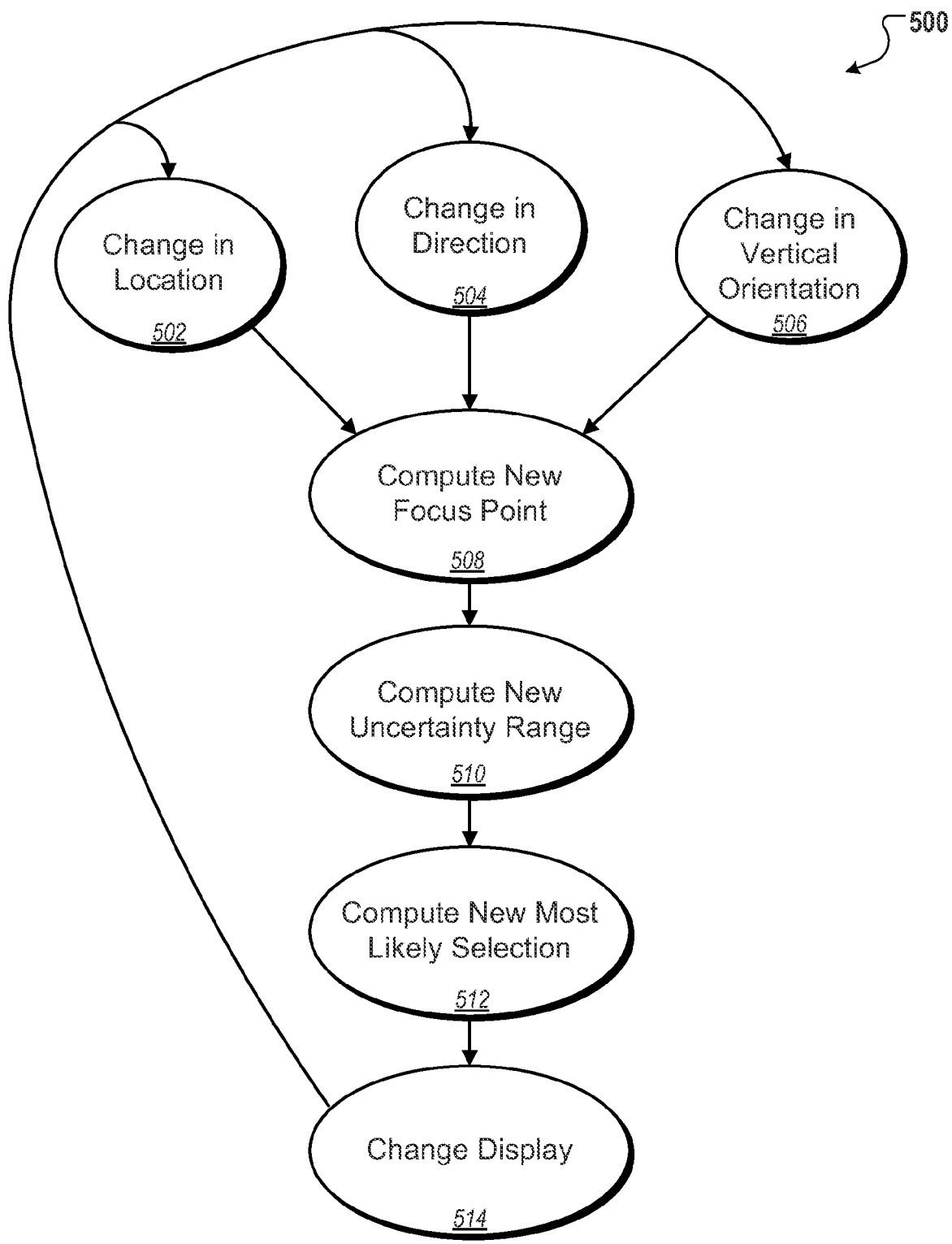
FIG. 5 is a flow diagram of actions taken in an augmented reality system.

FIG. 5 is a flow diagram 500 of actions taken in an augmented reality system. At stage 502, a change in location occurs. For example, a user of a mobile device walks down a city street, causing the position of the mobile device to change. In this example, the mobile device is equipped with a GPS unit that detects a change in the location of the mobile device. As another example, a user starts an augmented reality application on a mobile device. The augmented reality device uses a GPS unit or another location determination method to determine an approximate location for the mobile device. If the mobile device has moved since the last time the augmented reality application was executed, the augmented reality application determines that a change in location has occurred.

At stage 508, a new focus point is computed. In some implementations, new focus point is computed in response to a change in location taking place at stage 502. In some implementations, the new focus point is computed in response to a change in viewing direction (stage 504) or a change in vertical orientation (stage 506). For example, a user of a mobile device is walking down the street and turns around to face the opposite direction. A compass of the mobile device detects the change in direction and causes stage 508 to be performed in response to the change in direction. The new focus point is computed based on current position information. For example, the mobile device uses geographic location information, viewing direction information, and vertical angle information to determine objects, buildings, or locations that are within the viewing scope of a camera of the mobile device. The mobile device (or a remote server) uses the positional information to determine one or more objects, buildings, or locations that are within the viewing scope of the camera that are probable focus points of the user. For example, a building that is the closest to the center of a viewing direction of the mobile device can be identified as a probable point of focus.

At stage 510, a new uncertainty range is computed. The uncertainty range reflects uncertainty in positional measurements. For example, a measurement of a geographic location may only be accurate to within 50 feet. This can lead to a degree of uncertainty being associated with a point of focus for the user. In some implementations, the amount of uncertainty associated with a positional measurement does not change even when the value of the positional measurement itself changes. For example, a particular compass unit of a mobile device is accurate to within five degrees. Therefore the range of uncertainty for directional measurements made by the compass is always five degrees, even when a directional measurement made by the compass changes. In such implementations, in which the amount of uncertainty associated with a positional measurement does not change, the size and shape of an uncertainty range may remain the same while the position of the uncertainty range changes. In other implementations, the amount of uncertainty associated with a particular measurement may change. For example, a mobile device computes a location using GPS signals. A user of the mobile device walks down a street, causing the position of the mobile device to change. In this example, the mobile device is unable to receive GPS signals in the new location, and instead uses transmission tower triangulation in order to estimate a location for the mobile device. Since transmission tower triangulation is less accurate than GPS based location measurements, the level of uncertainty associated with the location measurement of the mobile device has changed, along with the actual value of the location measurement changing. In this particular example, the increased uncertainty associated with the new location measurement leads to an increase in the size of the new uncertainty range.

At stage 512, a new most likely selection is computed. The most likely selection is a data item that is most likely to be of interest to the user. The data item is associated with a location within the previously computed uncertainty range. In some implementations, the most likely selection is determined based on user profile data for the user. For example, a user profile for the user indicates that the user is interested in jazz music. If a jazz club is located within the uncertainty range, information on the jazz club is identified as a most likely selection. As another example, user profile data indicates that the user has an interest in high end fashion. If a high end clothing retailer is located within the viewing range of the mobile device, information associated with the clothing retailer is identified as the most likely selection. In some implementations, the most likely selection is based on past searches performed by the user, or general search data gathered from a plurality of users. For example, the term "Metrodome" may be a popular search term for users located in downtown Minneapolis. If the user of the mobile device is in downtown Minneapolis, information associated with the Metrodome is identified as the most likely selection.

At stage 514, the display is changed. For example, an annotation that includes information associated with the most likely selection is displayed on a display screen of the mobile device. As another example, a visual representation of the uncertainty range, such as for example, the bounding shape 108 of FIG. 1, is displayed on the display screen. In this example, the user can select within the visual representation of the uncertainty range to cause information about the most likely selection to be displayed. In some implementations, selecting within the visual representation of the uncertainty range causes a map from the current location of the mobile device to a location within the uncertainty range to be displayed.

In some implementations, a new change in location, direction, or vertical orientation of the mobile device will cause the process to start over. In some implementations, the actions depicted in the diagram 500 are not performed every time a change in the value of a positional measurement occurs. In some such implementations, a change in a positional measurement must exceed a specified threshold before a new focus point is computed. For example, a mobile device may require a change in location of five feet or more before stage 508 is performed. As another example, the mobile device requires a change in horizontal viewing direction of 10 degrees or more before stage 508 is performed. In some implementations, a slight change a position measurement will cause icons or annotations displayed on the mobile device to be repositioned, without a new focus point and uncertainty range being computed. For example, referring to FIG. 1, if the user of the mobile device 102 moves the mobile device 102 five degrees to the right, the mobile device 102 does not compute new focus point and uncertainty range values. Instead, the mobile device 102 will move the icon 106 and the bounding shape 108 to the left on the display screen 103 in order to compensate for the change in viewing direction of the mobile device 102. In some implementations, a first threshold must be met for a change in position measurement in order for a new focus point to be computed, and a second different threshold must be met for a change in position measurement in order for a new uncertainty range to be computed.

Figure 6:
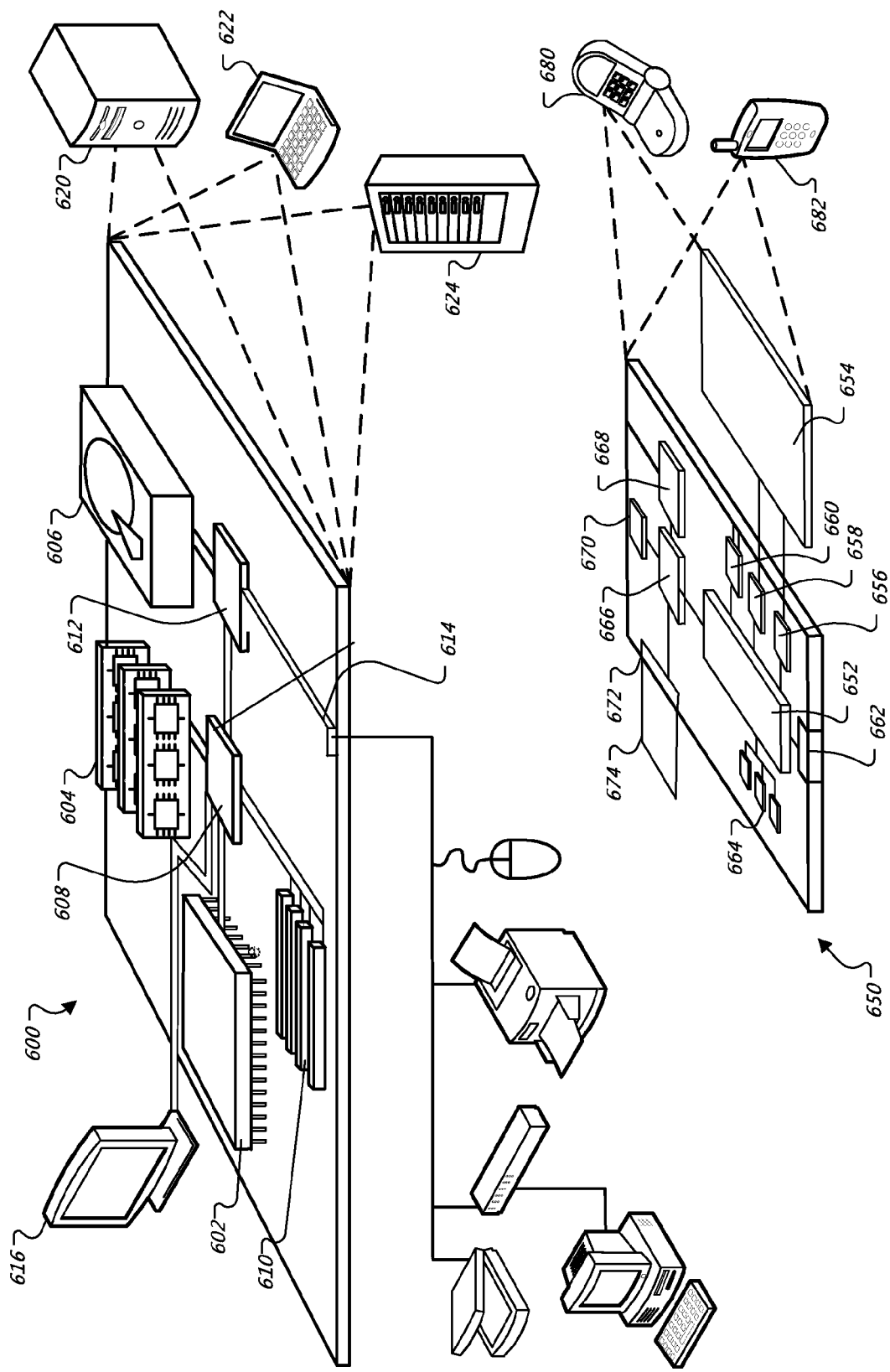
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Figure 7:
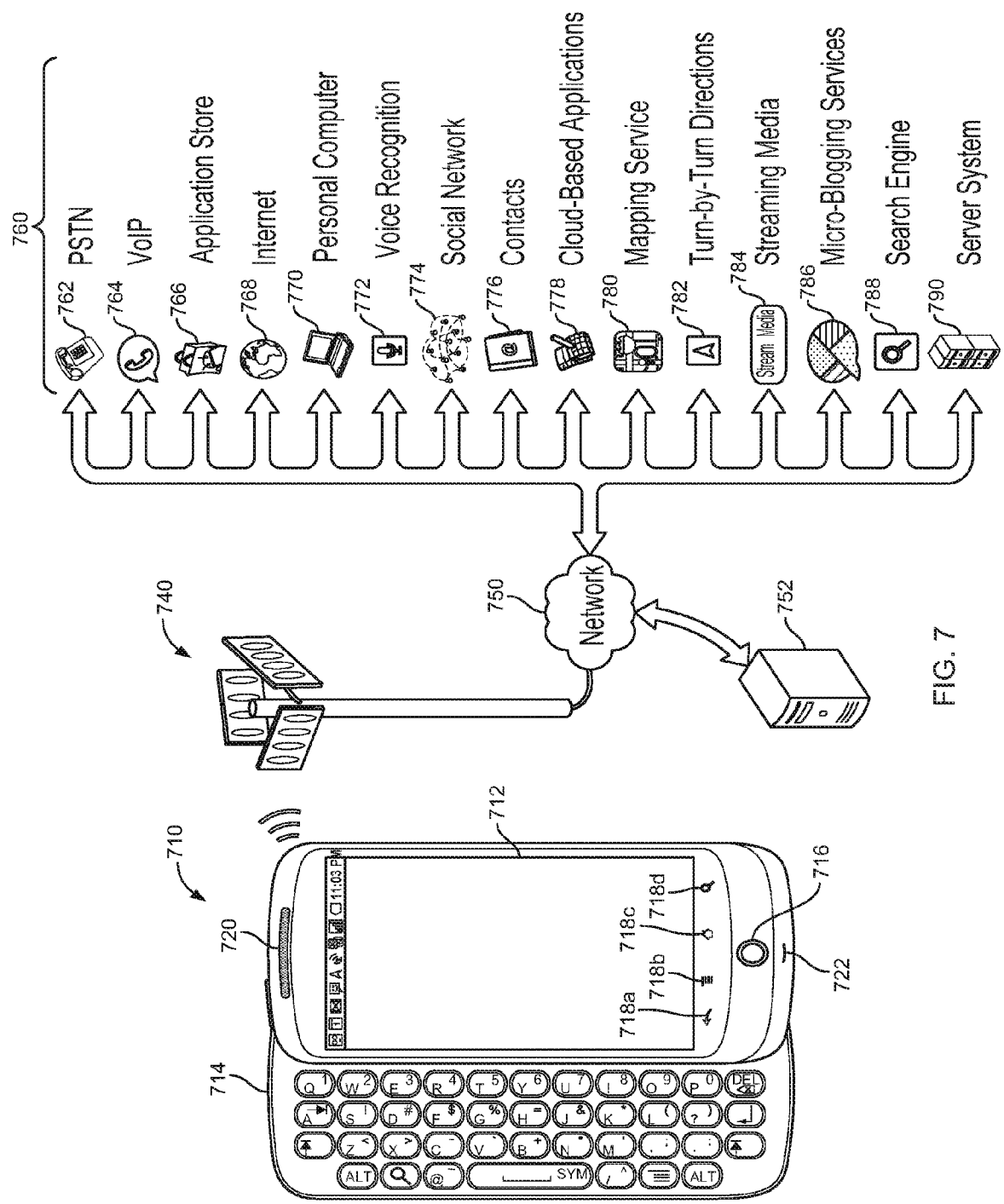
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or application telephone) that includes a touchscreen display device 712 for presenting content to a user of the mobile computing device 710 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 714, physical buttons, trackballs, accelerometers, gyroscopes, and magnetometers).

Example visual output mechanism in the form of display device 712 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 710. The mobile computing device 710 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a trackpad enables the user to supply directional and rate of rotation information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 704. User-selection of the button may invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user-selection of the "home" button 718c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 710 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 may include other application modules and hardware. A call handling unit may receive an indication of an incoming telephone call and provide a user capabilities to answer the incoming telephone call. A media player may allow a user to listen to music or play movies that are stored in local memory of the mobile computing device 710. The mobile telephone 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., Ethernet, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computerized devices that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing devices associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call with a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

A number of implementations have been described. Nevertheless, it will be understood that various modifications may be made without departing from the spirit and scope of this disclosure. Accordingly, other implementations are within the scope of the following claims.

What is claimed is:

1. A computer-implemented augmented reality method, comprising:
   obtaining electronic information that indicates a geographic location and a direction of aim of a computing device;
   identifying, based on the information that indicates the geographic location and the direction of aim of the computing device, a field of view for an augmented reality display;
   identifying, from a plurality of points of interest that fall within the field of view for the augmented reality display, a particular point of interest based on: (i) a frequency of search terms of search activity that is associated with a user of the computing device and that correspond with the plurality of points of interest, and (ii) a user profile associated with the user; and
   providing data for causing the computing device to overlay a real-world image of at least a portion of the field of view for the augmented reality display with:
      (i) a graphical indication of the particular point of interest, and
      (ii) a graphical indication of a level of uncertainty regarding a placement in the real-world image of the graphical indication of the particular point of interest with respect to an actual location of the particular point of interest.

2. The method of claim 1, wherein the obtained electronic information includes global positioning system data generated by the computing device.

3. The method of claim 1, wherein the obtained electronic information that indicates the direction of aim comprises information from a compass and accelerometer on the computing device.

4. The method of claim 1, wherein the obtained electronic information includes data from a wireless access point location determination system.

5. The method of claim 1, wherein the graphical indication of the particular point of interest is user-selectable in order to cause a display of additional data regarding the particular point of interest.

6. The method of claim 1, further comprising determining a level of uncertainty in the geographic location and the direction of aim of the computing device, wherein the level of uncertainty regarding the placement in the real-world image of the graphical indication of the particular point of interest is based on the level of uncertainty in the geographic location and the direction of aim of the computing device.

7. The method of claim 6, further comprising determining a size for the graphical indication of the level of uncertainty regarding the placement of the graphical indication of the particular point of interest based on the determined level of uncertainty in the geographic location and the direction of aim of the computing device, wherein a larger graphical indication of the level of uncertainty represents a higher potential uncertainty than a smaller graphical indication of the level of uncertainty.

8. The method of claim 7, wherein the graphical indication of the level of uncertainty overlaps with the particular point of interest.

9. A tangible, non-transient recordable storage media having recorded thereon instructions, that when executed, perform actions comprising:
   obtaining electronic information that includes a geographic location and a direction of aim of a computing device;
   identifying, based on the information that indicates the geographic location and the direction of aim of the computing device, a field of view for an augmented reality display;
   identifying, from a plurality of points of interest that fall within the field of view for the augmented reality display, a particular point of interest based on: (i) a frequency of search terms of search activity that is associated with a user of the computing device and that correspond with the plurality of points of interest, and (ii) a user profile associated with the user; and
   providing data for causing the computing device to overlay a real-world image of at least a portion of the field of view for the augmented reality display with:
      (i) a graphical indication of the particular point of interest, and
      (ii) a graphical indication of a level of uncertainty regarding a placement in the real-world image of the graphical indication of the particular point of interest with respect to an actual location of the particular point of interest.

10. The tangible, non-transient recordable storage media of claim 9, wherein the geographic location is determined from global positioning system data generated by the computing device.

11. The tangible, non-transient recordable storage medium of claim 9, the operations further comprising determining a level of uncertainty in the geographic location and the direction of aim of the computing device, wherein the level of uncertainty regarding the placement in the real-world image of the graphical indication of the particular point of interest is based on the level of uncertainty in the geographic location and the direction of aim of the computing device.

12. The tangible, non-transient recordable storage media of claim 11, the operations further comprising determining a size for the graphical indication of the level of uncertainty regarding the placement of the graphical indication of the particular point of interest based on the determined level of uncertainty in the geographic location and the direction of aim of the computing device, wherein a larger graphical indication of the level of uncertainty represents a higher potential uncertainty than a smaller graphical indication of the level of uncertainty.

13. The tangible, non-transient recordable storage media of claim 12, wherein the graphical indication of the level of uncertainty overlaps with the particular point of interest.

14. A computer-implemented augmented reality system, comprising:
  one or more position sensors for obtaining electronic information that indicates a geographic location and a direction of aim of a computing device;
  a positional uncertainty computation module programmed to identify, based on the information that indicates the geographic location and the direction of aim of the computing device, a field of view for an augmented reality display; and
  an augmented reality application on the computing device programmed to:
    identify, from a plurality of points of interest that fall within the field of view for the augmented reality display, a particular point of interest based on: (i) a frequency of search terms of search activity that is associated with a user of the computing device and that correspond with the plurality of points of interest, and (ii) a user profile associated with the user, and
    provide data for causing the computing device to overlay a real-world image of at least a portion of the field of view for the augmented reality display with:
      (i) a graphical indication of the particular point of interest, and
      (ii) a graphical indication of a level of uncertainty regarding a placement in the real-world image of the graphical indication of the particular point of interest with respect to an actual location of the particular point of interest.

15. The system of claim 14, wherein the one or more position sensors comprise a global positioning system (GPS) sensor and a compass.

16. The system of claim 14, wherein the level of uncertainty regarding the placement in the real-world image of the graphical indication of the particular point of interest is based on a combination of error values for each of the one or more position sensors.

17. The system of claim 14, wherein the graphical indication of the level of uncertainty regarding the placement of the graphical indication of the particular point of interest based on the determined level of uncertainty in the geographic location and the direction of aim of the computing device represents an area of a display of the augmented reality application within which a user's focus cannot be determined.

18. The system of claim 14, wherein the identified information includes data from a wireless access point location determination system.

19. The system of claim 14, wherein the graphical indication of the particular point of interest is user-selectable in order to cause a display of additional data regarding the particular point of interest.

20. The system of claim 14, wherein the positional uncertainty computation module is further programmed to determine a level of uncertainty in the geographic location and the direction of aim of the computing device, wherein the level of uncertainty regarding the placement in the real-world image of the graphical indication of the particular point of interest is based on the level of uncertainty in the geographic location and the direction of aim of the computing device.

21. The system of claim 20, wherein the positional uncertainty computation module is further programmed to determine a size for the graphical indication of the level of uncertainty regarding the placement of the graphical indication of the particular point of interest based on the determined level of uncertainty in the geographic location and the direction of aim of the computing device, wherein a larger graphical indication of the level of uncertainty represents a higher potential uncertainty than a smaller graphical indication of the level of uncertainty.

22. The system of claim 21, wherein the graphical indication of the level of uncertainty overlaps with the particular point of interest.

23. A computer-implemented augmented reality system, comprising:
  one or more position sensors for obtaining electronic information that indicates a geographic location and a direction of aim of a computing device;
  means for identifying, based on the information that indicates the geographic location and the direction of aim of the computing device, a field of view for an augmented reality display; and
  an augmented reality application on the computing device programmed to:
    identify, from a plurality of points of interest that fall within a field of view for the augmented reality display, a particular point of interest based on: (i) a frequency of search terms of search activity that is associated with a user of the computing device and that correspond with the plurality of points of interest, and (ii) a user profile associated with the user, and
    provide data for causing the computing device to overlay a real-world image of at least a portion of the field of view for the augmented reality display with:
      (i) a graphical indication of the particular point of interest, and
      (ii) a graphical indication of a level of uncertainty regarding a placement in the real-world image of the graphical indication of the particular point of interest with respect to an actual location of the particular point of interest is located.

24. The system of claim 23, wherein the augmented reality application is further programmed to determine a level of uncertainty in the geographic location and the direction of aim of the computing device, wherein the level of uncertainty regarding the placement in the real-world image of the graphical indication of the particular point of interest is based on the level of uncertainty in the geographic location and the direction of aim of the computing device.

\* \* \* \* \*

UNITED STATES PATENT AND TRADEMARK OFFICE
CERTIFICATE OF CORRECTION

PATENT NO.        : 8,681,178 B1
APPLICATION NO.   : 12/917945
DATED             : March 25, 2014
INVENTOR(S)       : Tseng Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this
Eleventh Day of August, 2015

Michelle K. Lee
*Director of the United States Patent and Trademark Office*